(12) United States Patent
Van Lunteren

(10) Patent No.: US 6,453,380 B1
(45) Date of Patent: Sep. 17, 2002

(54) ADDRESS MAPPING FOR CONFIGURABLE MEMORY SYSTEM

(75) Inventor: Jan Van Lunteren, Adliswil (CH)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/484,746

(22) Filed: Jan. 18, 2000

(30) Foreign Application Priority Data

Jan. 23, 1999 (EP) ............................................ 99101258

(51) Int. Cl.[7] .............................................. G06F 12/00
(52) U.S. Cl. ............................ 711/5; 711/205; 711/157
(58) Field of Search ........................... 711/5, 202, 157, 711/206, 207, 205

(56) References Cited

U.S. PATENT DOCUMENTS

| | | | | |
|---|---|---|---|---|
| 5,787,454 A | * | 7/1998 | Rohlman | 711/5 |
| 5,924,111 A | * | 7/1999 | Huang et al. | 711/5 |
| 6,131,146 A | * | 10/2000 | Aono | 711/157 |
| 6,145,063 A | * | 11/2000 | Ueno et al. | 711/157 |

* cited by examiner

*Primary Examiner*—Matthew Kim
*Assistant Examiner*—Matthew D. Anderson
(74) *Attorney, Agent, or Firm*—Scully, Scott, Murphy & Presser; Manny W. Schecter, Esq.

(57) ABSTRACT

In a system in which data are stored in an interleaved fashion in a memory consisting of a plurality of memory banks, a method and means are provided for mapping a given address into a memory bank and an internal memory bank address. Lookup table means (LUT1; LUT2) are provided for furnishing not only a bank number but also a part (MSP) of the internal bank address, in response to selected portions (X, Y) from the given address, while the remainder (LSP) of the internal bank address is directly taken from the given address. Two implementations are disclosed in which either two lookup tales are provided, or two sections in a single lookup table, for separately generating the bank number and a part of the internal bank address. Another implementation provides two lookup tables which are accessed sequentially and which provide different intermediate outputs (m, n, p, q, r) which are selectively combined (B, C) to obtain bank number as well as part of the internal bank address.

18 Claims, 10 Drawing Sheets

ADDRESS MAPPING FOR CONFIGURABLE MEMORY SYSTEM

BACKGROUND OF THE INVENTION

1. Technical Field

The present invention relates generally to address mapping for accessing system memory, and more particularly to address mapping for memories consisting of a plurality of memory banks in which interleaving of stored information is effected.

2. Prior Art

In data processing systems, data or programs which are required for immediate processing are loaded into memory. If the loading of information blocks into memory is effected in the same consecutive sequence as they are provided, e.g. data in rows and columns of a table, or program statements in consecutive lines of a program writeup, there may be timing problems if they have to be accessed sequentially.

Thus, if blocks of data (or program segments) with consecutive block addresses are mapped on consecutive lines within one memory module, then a problem occurs if they have to be accessed in the same sequence, because usually, when access has been made to one line, the memory module needs a short period of time before the next access can be made. Accesses to consecutive block addresses therefore would need more time than is desirable.

One solution to this problem is the interleaving of data (information) in separate memory banks which can be separately accessed. Thus, if storage locations with consecutive block addresses are distributed over separate memory banks, the blocks can be accessed one immediately after the other without any waiting time. The simplest way to do this is to use the least significant portion of the given block address as the memory bank number and the remainder of the block address as internal bank address (or line-number).

However, this known method requires a number of memory banks which is a power of two, and the interleaving is uniform (sequential) which is not optimal in various applications. In general, it can be said that often, sequential accesses to memory are not randomly distributed but follow a certain pattern depending on the respective application. This is in particular true for scientific applications. Thus, even if information is stored in an interleaved manner, sequential accesses for consecutive block addresses may occur to the same memory bank. If possible, memory accesses should be distributed uniformly over all memory banks to achieve best performance.

A solution to this problem was disclosed in pending U.S. patent application Ser. No. 09/194,275, entitled "Address Mapping for System Memory." In the described method and means, given block addresses are mapped to multi-bank memory addresses by taking portions of the given address for accessing a lookup table to obtain a memory bank number stored there, and then taking a remainder of the given address as the bank internal or line address. This allowed to use arbitrary numbers of memory banks, and to achieve various different interleave factors as required by providing respective lookup tables. However, as only a single lookup operation is made for just obtaining the memory bank number, this method has some limitations and is not yet adequate for great differences in memory structure or design.

Thus, known methods and systems, though allowing some variation in the interleaving, do not have the possibility to freely select an interleaving scheme that is optimal for greatly varying types and constructions of memories.

It is, therefore, an aim of the invention to devise a method of and means for address mapping for a multibank system memory that allows a wider variety of interleaving schemes for a large range of different memory designs and that is applicable even if different memory technologies are combined in the same memory, e.g. when providing 8 M, 16 M and 64 M byte memory modules in one system.

SUMMARY OF THE INVENTION

These objects are achieved by an address mapping method for system memory and by mapping means as defined in the claims of this patent application.

The following advantages are particularly achieved by the invention:

By using lookup operations also for deriving the internal bank address (besides looking up the bank number in a table), the mapping scheme can be used for an even greater variety of memory designs combined in a single system, and an improved distribution of memory accesses for a wider variety of strides is possible. This results in a better performance for such cases which are more often encountered today.

When differently sized memory banks need to be supported, conventional methods usually apply a mix of subtract and compare operations during addressing. Such operations can be saved when the invention is used. Time will be saved due to faster memory mapping operations. In two of the implementations of the invention, the address mapping is still a single-step operation that can be provided in the addressing path. In another implementation using sequential table accesses, the application of the invention results in a significant reduction in the storage space required for the lookup tables. The invention can also be used for applications where non-contiguous address spaces are employed ("hole" in the address space).

Other advantage s which were already achieved by the above mentioned known solution are still available with the new improved address mapping method of the present invention:

Selective interleaving schemes are possible for any number of memory banks (even non-power-of-two) and for memory banks of different sizes in the same memory. Non-integer interleave factors between one and the number of memory banks are possible. Different interleaving schemes can be effected in the same memory. Interleaving for two different power-of-two strides is possible in the same memory. Due to table-lookup, no complicated arithmetic or other processing operations are required for address mapping. The mapping scheme can easily be changed by loading different contents into the tables, or by selectively using several preloaded tables.

BRIEF DESCRIPTION OF THE DRAWINGS

Preferred embodiments of the present invention will now be described, by way of example only, with reference to the accompanying drawings in which.

DETAILED DESCRIPTION OF THE PREFERRED EMBODIMENTS OF THE INVENTION

A few definitions are given in the following to clarify the meaning of terms as they are used in this patent application. Physical address=an address uniquely identifying the position in memory (as obtained from a virtual address e.g. by a table look aside operation). The physical address comprises a block address (identifying a memory block) and a block offset (not relevant for present invention). The term "given address" is also used for the block address in present description.

Memory bank=a piece of memory that can be separately accessed (also called memory module; it may be a memory chip).

Stride=an address sequence $a_0, a_1, a_2, a_3, \ldots$ has a stride S when for each two succeeding addresses holds: $a_{i+1}=a_i+S$ (i.e., the address sequence is $a_0, a_0+S, a_0+2S, a_0+3S, \ldots$).

Internal bank address=identifies one line within a selected memory bank. Such a line may contain one memory block of information (as identified by a block address). Interleave factor=The interleave factor for an address sequence $a_0, a_1, a_2, a_3, \ldots$ is the average number of memory banks that can be accessed in parallel when accessing the addresses of the address sequence in the given order.

Environment of the Invention

Figure 1:
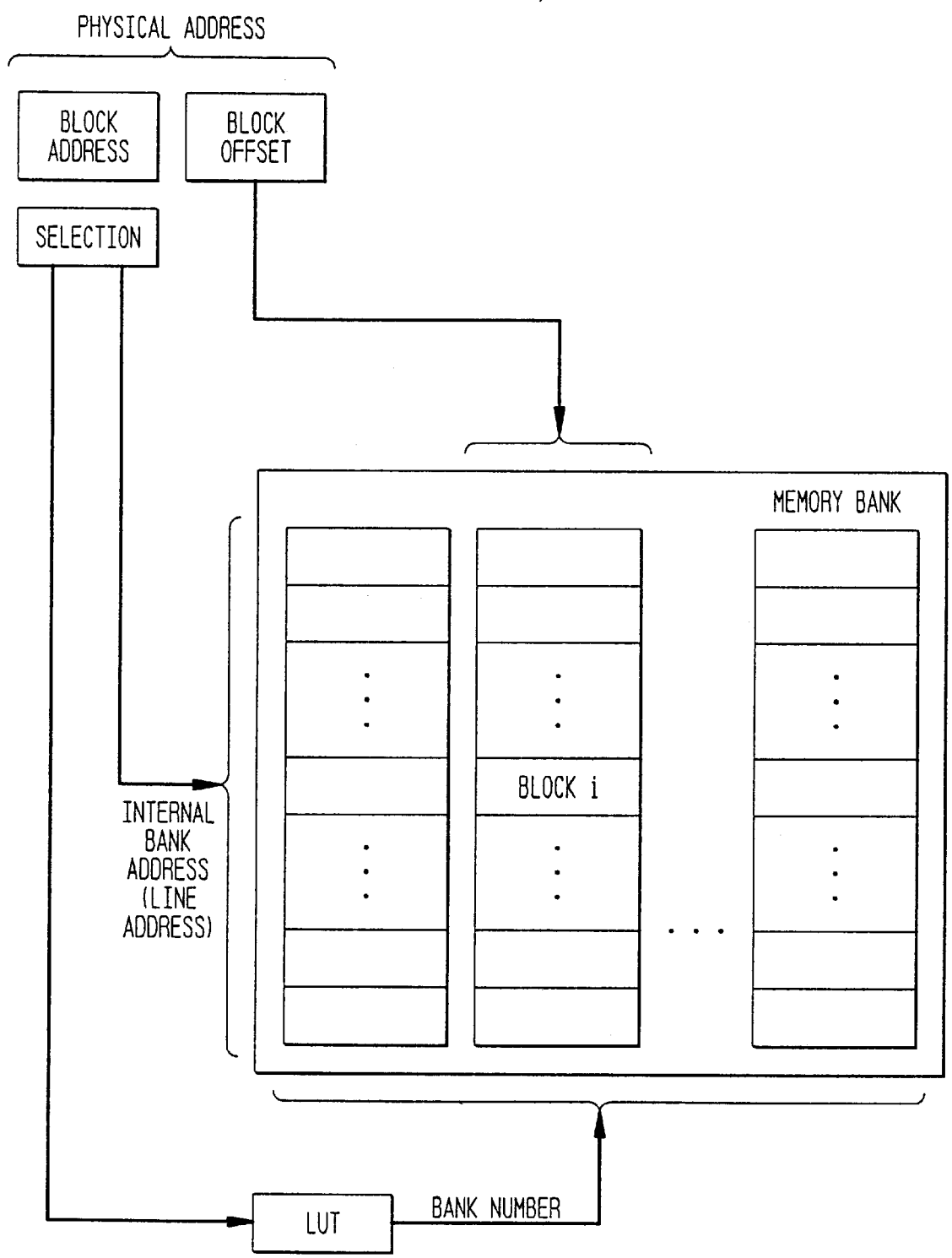
FIG. 1 illustrates a memory addressing scheme for configurable memory as known from the prior art.

FIG. 1 is a schematic representation of the addressing mechanism for a configurable memory system as it is known from the above-mentioned patent application and for which present invention is an improvement. A physical address for a memory access consists of the block address (which is also termed the "given address" in present description), and the block offset, i.e. the relative address within the addressed block. The block address (given address) is first used for determining the memory bank number. Selected portions of the block address are used for addressing a lookup table LUT, which then issues the required "bank number" identifying one bank within the multi-bank memory arrangement. The contents of the lookup table determines the distribution of memory accesses within the memory, for particular sequences of block addresses. The remainder of the block address (given address) is directly used as line address in the memory, i.e. as memory "internal bank address". Thus, the internal bank address selects one memory block within the preselected memory bank.

Finally, the block offset, i.e. the lower portion of the block address, is used to address a specific data item within the selected block. In the following description of the invention, this block offset is omitted, i.e., the description only covers the mapping of a block address (given address) into a bank number and internal bank address for selecting one memory block.

As was mentioned in the introduction already, the known address mapping scheme as shown in FIG. 1 allowed to achieve desired memory access distributions for expected address sequences, but was still limited in some respects. The present invention described in the following will allow a wider variety of distributions for even more different memory configurations.

First Embodiment of Invented Mapping Scheme (FIG. 2 to FIG. 6)

Figure 2:
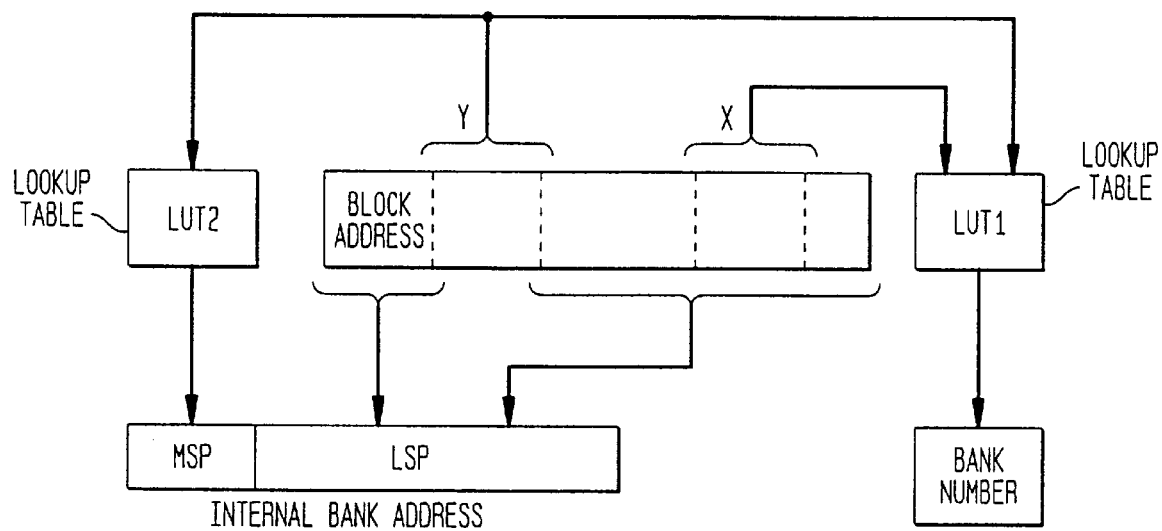
FIG. 2 illustrates a first embodiment of the invention, using two lookup tables for address mapping, one for the bank number, and the other for the internal bank address.

FIG. 2 shows a first embodiment of the invented address mapping scheme, and FIGS. 3 to 6 are particular examples of mappings using this principal scheme.

As can be seen from FIG. 2, two separate lookup tables LUT1 and LUT2 are used for the address conversion. Two selected portions X and Y of the block address part (given address) of a physical address are used for accessing the first table LUT1, which then will output the required bank number. In a parallel, but separate operation, the second operation, the second selected portion Y is used for addressing the second Table LUT2, which then issues the most significant part (MSP) of the required internal bank address. The remaining, least significant part (LSP) of the internal bank address is then constituted, as known from the previous solution, as the remainder of the block address (given address) after the second selected portion Y is deleted.

It should be noted that the portions X and Y can be selected anywhere in the given block address, and can have a length and distribution as is most advantageous for a particular case.

In the following, four examples for application of the above-described addressing scheme are explained in connection with FIGS. 3 to 6. These examples cover different distribution patterns and memory configurations. In each figure, there is shown the location of the selected portions X and Y within the block address (given address), the contents of the two lookup tables LUT1 and LUT2, and the distribution of stored data blocks (and actual accesses) in the memory for consecutive given addresses (block addresses). Stride one has been selected for the examples to simplify illustration (and because it is the stride mostly occurring), but other stride values are well possible.

(a) First Example (FIG. 3):

In this example, stride 1 address sequences are mapped with an interleave factor equal to 4.

From the block address (given address) the four MS bits are taken as Y and the two LS bits are taken as X. Thus, sixteen columns and four lines could be addressed with X and Y in a lookup table, and sixteen positions (or columns in a single line table) can be addressed using only Y. In the present example, the table LUT1 containing the bank numbers has ten columns of which actually only four are used. The table LUT2 containing the most significant part of the internal bank address (in this case a single bit) has ten positions of which only four are used. The required total size for both lookup tables in this case is as follows: there are 10×(4+1) positions in the tables, each able to contain a 3-bit number. This means that 150 bits or ca. 19 bytes are the required size TS for the lookup tables.

This example shows the application of the method on a memory configuration consisting of four memory banks all having the same size.

(b) Second Example (FIG. 4):

In this example, stride 1 address sequences between 0 and 3FFFFFh are mapped with an interleave factor equal to 4 and stride 1 address sequences between 400000h and 5FFFFFh are mapped with an interleave factor equal to 2.

The same selected portions X and Y of the given address are used as in the previous example, and the table sizes are also the same so that the required total lookup table size is also ca. 19 bytes.

This example shows the application of the method on a memory configuration consisting of four memory banks, with two different bank sizes.

(c) Third Example (FIG. 5):

In this example, stride 1 address sequences between 0 and 4FFFFFh are mapped with an interleave factor equal to 4 an stride 1 address sequences between 500000h and 7FFFFFh are mapped with an interleave factor equal to 2.

From the block address (given address) the three MS bits are taken as Y and the two LS bits are taken as X. Thus, eight columns and four lines can be addressed with X and Y in a lookup table, and eight positions (or columns in a single line table) can be addressed using only Y. In the present example, the table LUT1 containing the bank numbers (five different numbers each represented by three bits) has four lines which can be addressed separately by X, and the table LUT2 containing the most significant part of the internal bank address has also eight (column) positions of which one is selected by the value Y which also selects the column in table LUT1. The required total size for both lookup tables in this case is as follows: there are 8×(4+1) positions in the tables, each able to contain a 3-bit number. This means that 120 bits or 15 bytes are the required size TS for the lookup table.

This example shows the application of the new mapping method on a memory configuration consisting of five memory banks (non-power-of-2 number of memory banks), with two different bank sizes).

(d) Fourth Example (FIG. 6):

In this example, stride 1 address sequences between 0 and 57FFFFh are mapped with an interleave factor equal to 4 and stride 1 address sequences between 580000h and 7FFFFFh are mapped with an interleave factor equal to 2.

From the block address (given address) the four MS bits are taken as Y and the two LS bits are taken as X. Thus, sixteen columns and four lines can be addressed with X or Y in a lookup table, and sixteen positions (or columns in a single line table) can be addressed using only Y. In the present example, the table LUT1 containing the bank numbers (seven different numbers represented by three bits) has actually sixteen columns. The table LUT2 containing the most significant part of the internal bank address (in this case four different numbers, i.e. two bits) has sixteen positions. The required total size for both lookup tables in this case is as follows: there are 16×(4+1) positions in the tables, each able to contain a 3-bit number. This means that 240 bits or 30 bytes are the required size TS for the lookup tables.

This example shows the application of the method on a memory configuration consisting of seven memory banks (non-power-of-2 number of memory banks), with four different bank sizes.

Figure 7:
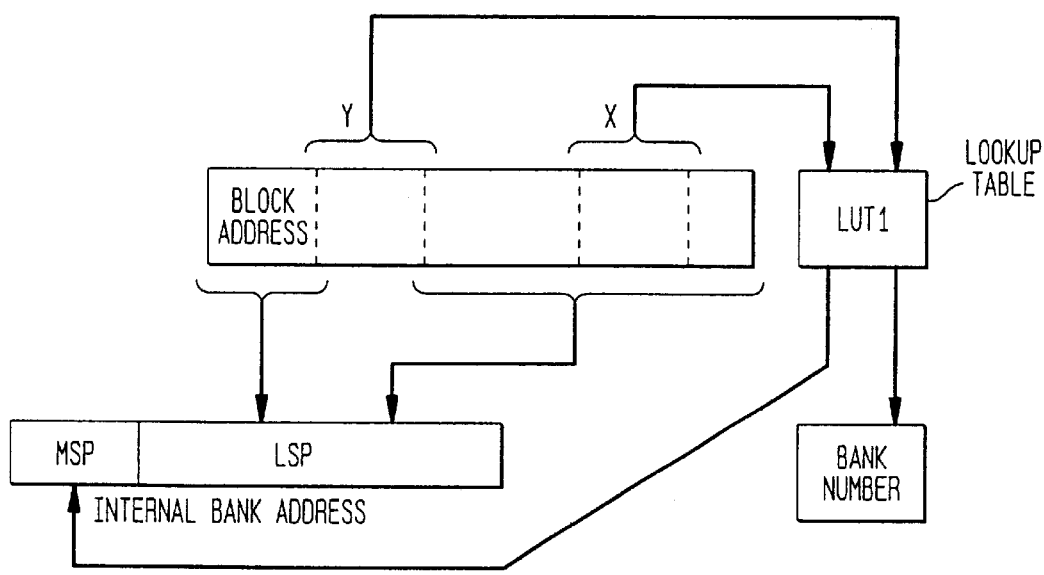
FIG. 7 illustrates a second embodiment of the invention using one lookup table for memory mapping, with two different outputs for bank number and internal bank address, respectively.
Figure 3:
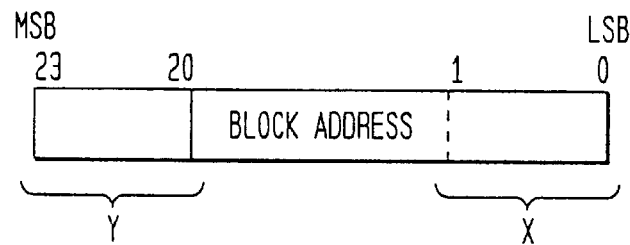
FIG. 3 to FIG. 6 show examples of memory mappings for the first embodiment of the invention using two tables, for different table sizes and memory configurations.
Figure 4:
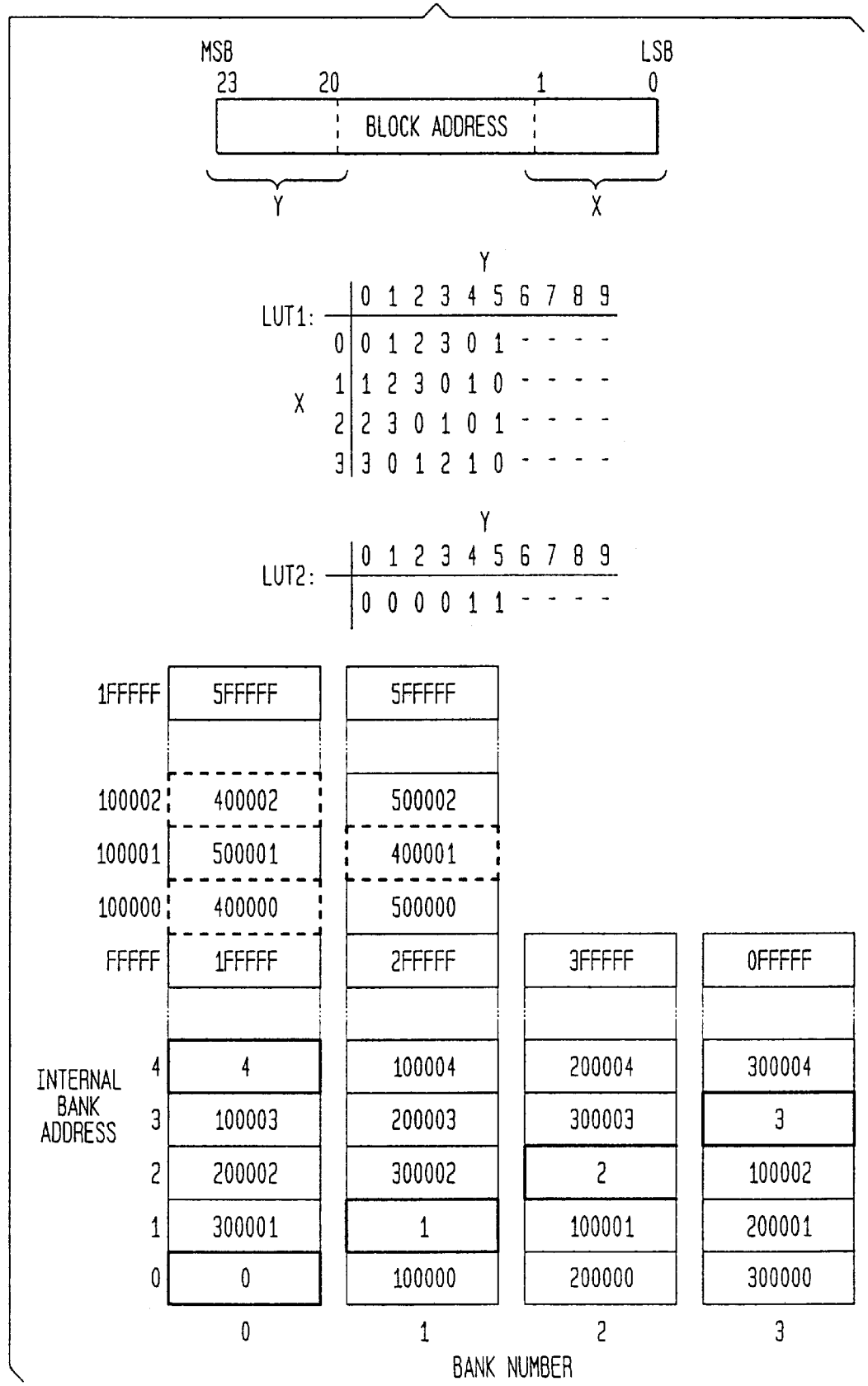
Figure 8:
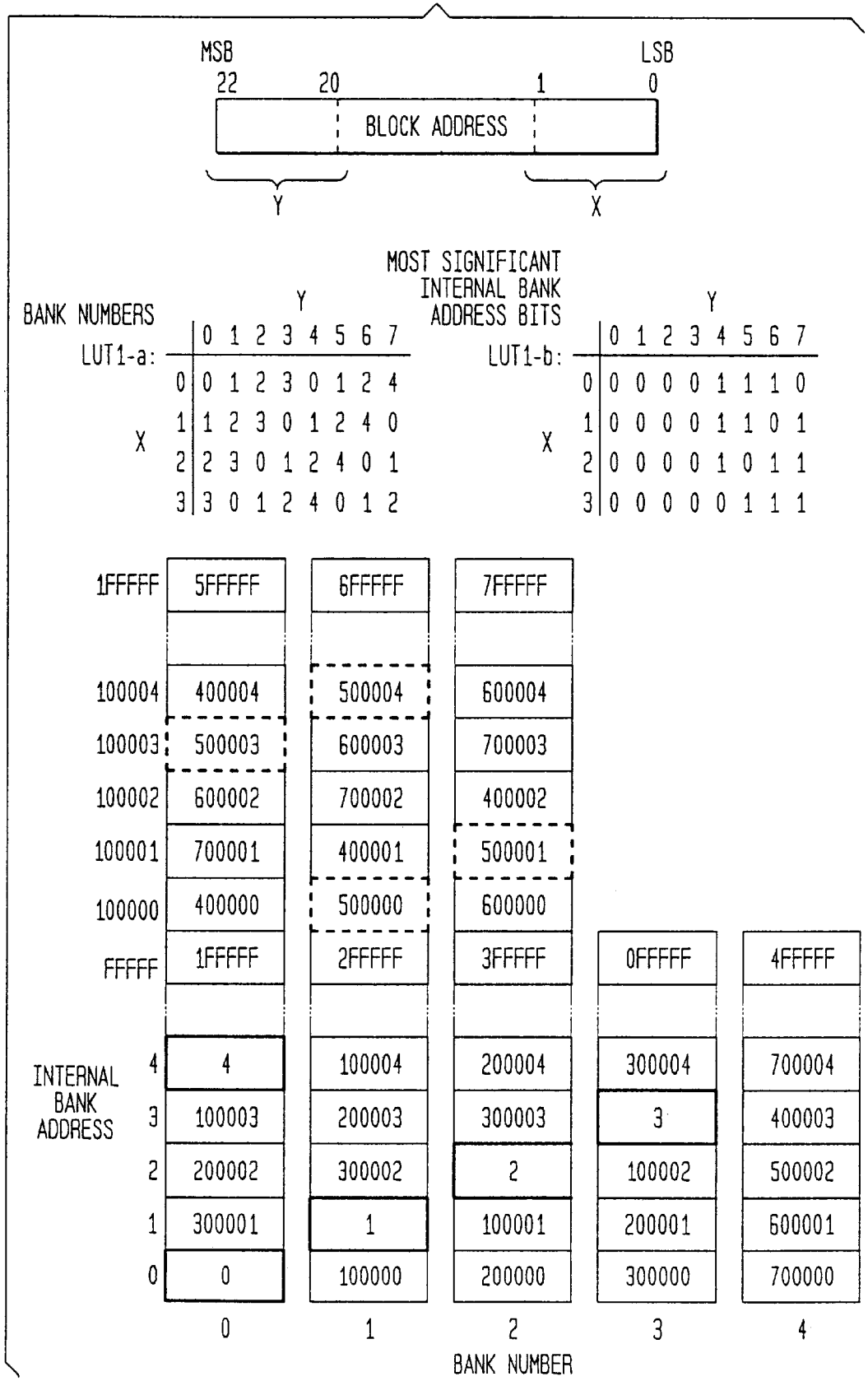
FIG. 8 shows an example of memory mapping for the second embodiment of the invention, for the same memory configuration as in the example of FIG. 5, but with a better memory utilization.

Second Embodiment of Invented Mapping Scheme (FIG. 7 and FIG. 8)

FIG. 7 shows a second embodiment of the invented address mapping scheme, and FIG. 8 is a particular example of mapping using this principal scheme.

In this embodiment, a single lookup table LUT1 is used for address mapping but this table has two separate outputs: one for a bank number and one for a part of the internal bank address. As will be shown in the example explained below, the table LUT1 may comprise two sections which can be addressed simultaneously. As in the first embodiment, two portions X and Y are selected from the block address (given address), for obtaining the memory bank number and part of the internal bank address. These two portions (which can be determined in length and location depending on the respective case) are used to address the lookup table. This table contains in each location, besides a bank number, a most significant part of the internal bank address. Both are obtained with a single access to the lookup table. Both can be determined independent from each other prior to the start of an application, i.e., prior to loading or activating the lookup table LUT1.

For the least significant part of the internal bank address, the remaining portion of the block address (given address), after deleting Y, is taken. This is of course (as in the first embodiment) only one possibility for generating the LS portion of the internal bank address. Other combinations or selections are possible within the gist of the invention.

In the following, an example for application of the above described addressing scheme is explained in connection with FIG. 8. The table LUT1 comprises two sections LUT1-a and LUT1-b which are addressed simultaneously. In the figure, there is shown the location of the selected portions X and Y within the given block address, the contents of the two sections LUT1-a and LUT1-b of the lookup table LUT1, and the distribution of "physical addresses" and actual addresses for sequential physical addresses in the memory.

Example (FIG. 8):

In this example, stride 1 address sequences between 0 and 7FFFFFh are mapped with an interleave factor equal to 4. The memory consists of five banks (non-power-of-2 number of memory banks), having two different sizes.

In this example, the three MS bits of the given block address are taken as Y and the two LS bits are taken as X. Thus, eight columns and four lines can be addressed with X and Y in a lookup table. In the present example, the table section LUT1-a containing the bank numbers (five different numbers represented by three bits) has four lines which can be addressed separately by X, and the table section LUT1-b containing the most significant part of the bank internal address (in this case only a single bit) has also four lines to be addressed by X. With the same combination of selected portions X and Y, one position is selected in both lookup table sections simultaneously. The required total size for both lookup table sections in this case is as follows: there are 8×(4+4) positions in the tables, each able to contain a 3-bit number. This means that 192 bits or 24 bytes are the required size TS for the lookup table.

Figure 5:
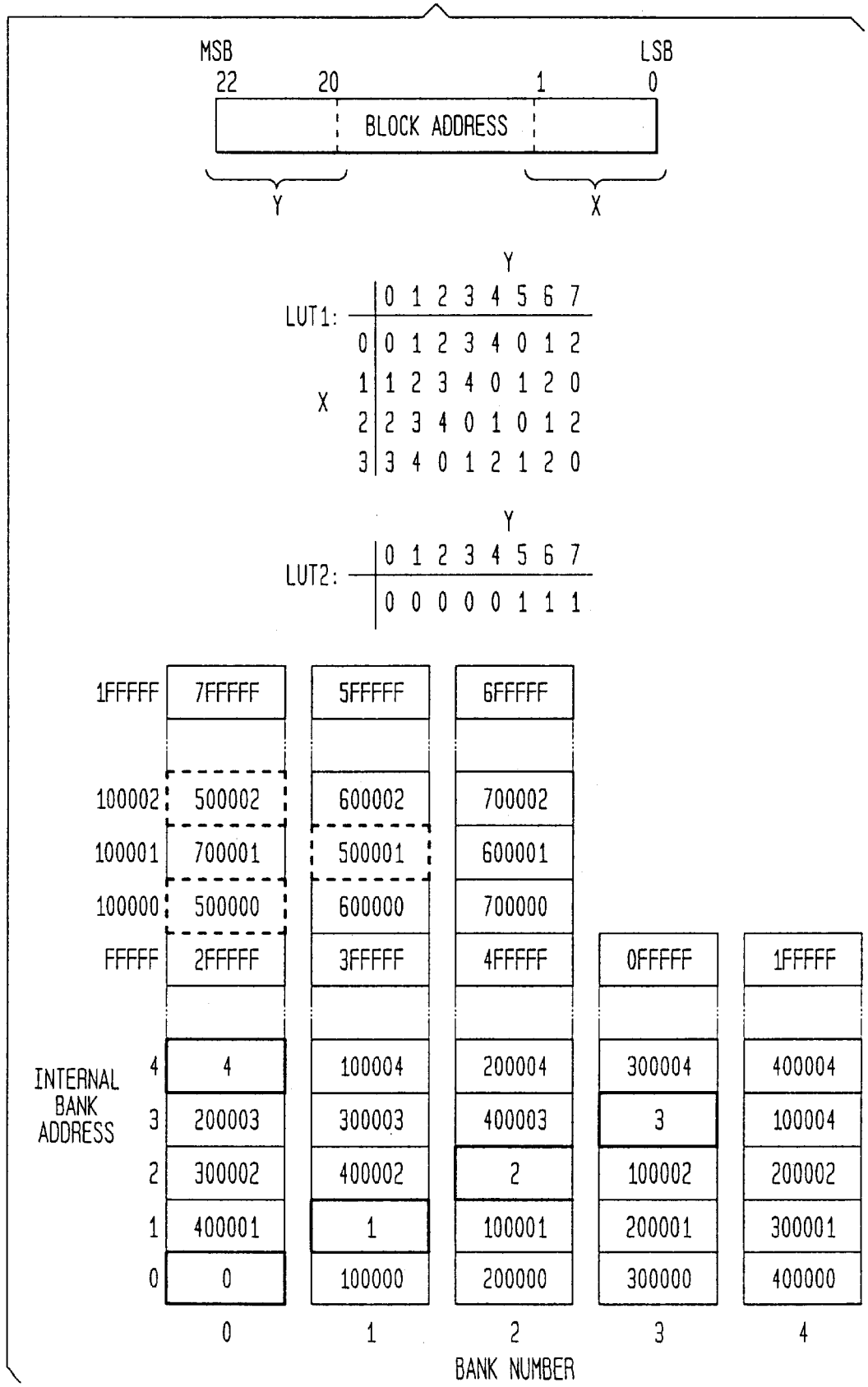
Figure 6:
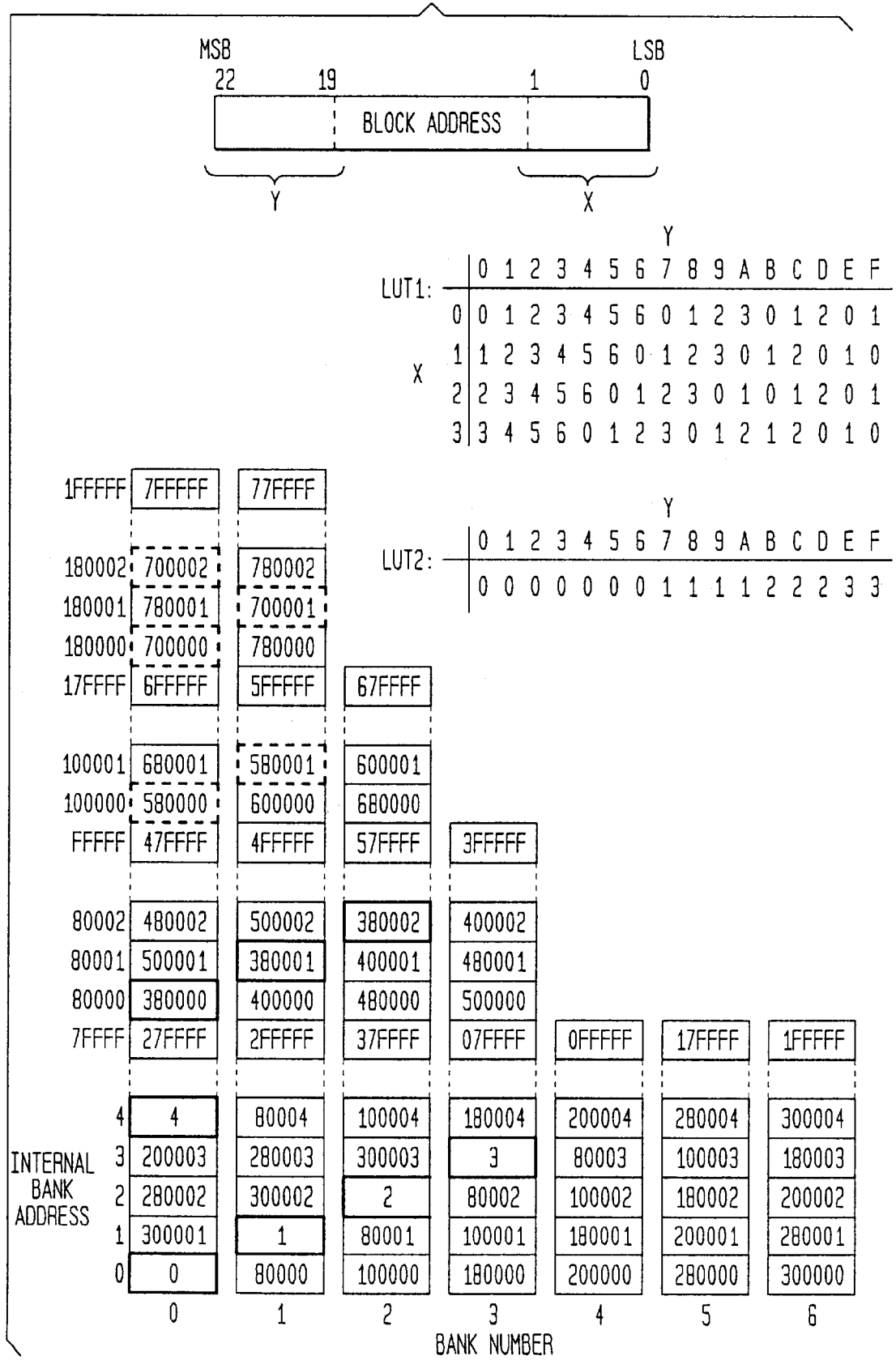

This example shows the application of the method on the same memory configuration that was shown in the example of FIG. 5. In the present example, stride 1 address sequences are mapped with an interleave factor equal to 4 throughout the entire address space, in contrast to the example shown in FIG. 5, in which stride 1 address sequences between 500000h and 7FFFFFh are mapped with a smaller interleave factor equal to 2.

Figure 9:
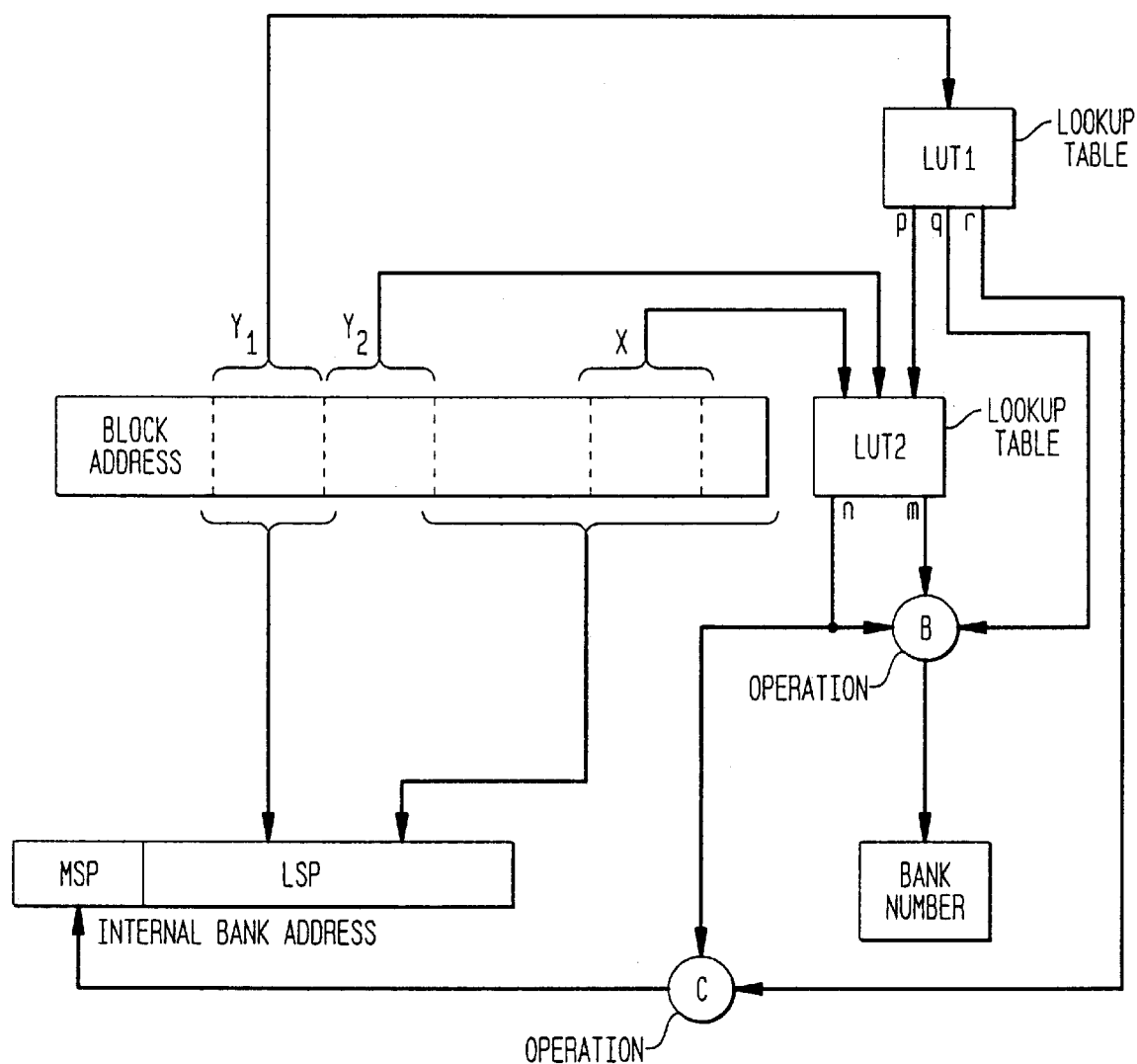
FIG. 9 illustrates a third embodiment of the invention, using two lookup tables and sequential accesses to these tables, for obtaining the bank number and a portion of the internal bank address.

Third Embodiment of Invented Mapping Scheme (FIG. 9 and FIG. 10)

FIG. 9 shows a third embodiment of the invented address mapping scheme, and FIG. 10 (10A and 10B) is particular example of mapping using this principal scheme.

As can be seen from FIG. 9, two separate lookup tables LUT1 and LUT2 are used for the address conversion. They are used in two sequential, separate accesses for obtaining the required memory bank number and the MS part of the internal bank address. Two selected portions X and Y of the block address part of a given address are used; one of these selected address portions is split into two sections Y1 and Y2 which are separately used. For accessing the first table LUT1, only one section Y1 (of selected address portion Y) is used, and the lookup table then issues three separate auxiliary values p, q and r. The second lookup table is addressed by a combination of the other section Y2 (of selected address portion Y), the first selected address portion X, and one auxiliary value p. This table LUT2 will then output two further auxiliary values m and n.

For obtaining the required bank number, three of the auxiliary values, i.e. m, n and q, are then combined in an operation B which issues a single value as bank number BN. The operation B can be an addition, a concatenation or any other suitable operation that is determined in dependence of the requirements of the respective system.

For obtaining the most significant part of the internal bank address, the two auxiliary values n and r are combined in another operation C which issues then a single bit sequence MSP. Also operation C (addition, concatenation, or other) is determined in dependence of the characteristics of the respective system. The remaining, least significant part of the internal bank address is then constituted, as known from the previous solution, as the remainder of the given block address after the second selected portion Y (i.e., Y1 and Y2) is deleted.

It should be noted that also in this embodiment, the portions X and Y (and its subsections Y1 and Y2) can be selected anywhere in the given block address, and can have a length and distribution as is most advantageous for a particular case. Furthermore, the number and combination of auxiliary values (p, q, r, m, n) can also be varied according to the desired results.

Due to the sequential access in two lookup tables and necessary combination of output values, the generation of bank number and MSP of the internal bank address need somewhat more time than is required for a single-table access or a parallel two-table access, as is the case in the two first embodiments. However, this is more then compensated by the much higher flexibility because of the multiplicity of possible combinations; but in particular, the two tables can be much smaller than would be required for an implementation with the same mapping variation possibilities using a single lookup table, for very large memory systems. (The following example, however, can only show—for illustration—a relatively small memory system).

Example (FIG. 10):

In the following, an example for application of the above described addressing scheme is explained in connection with FIGS. 10A and 10B. In these figures, there is shown the location of the selected portions X and Y (Y1, Y2) within the block address (given address), the contents of the two lookup tables LUT1 and LUT2, and the actual distribution of data blocks and accesses in memory for consecutive block addresses (given addresses). For this example, a memory consisting of nine banks of three different sizes, and address sequences all having a stride ST=1 are assumed. Two different interleave factors (IF=4 and IF=1) are achieved.

Figure 10A:
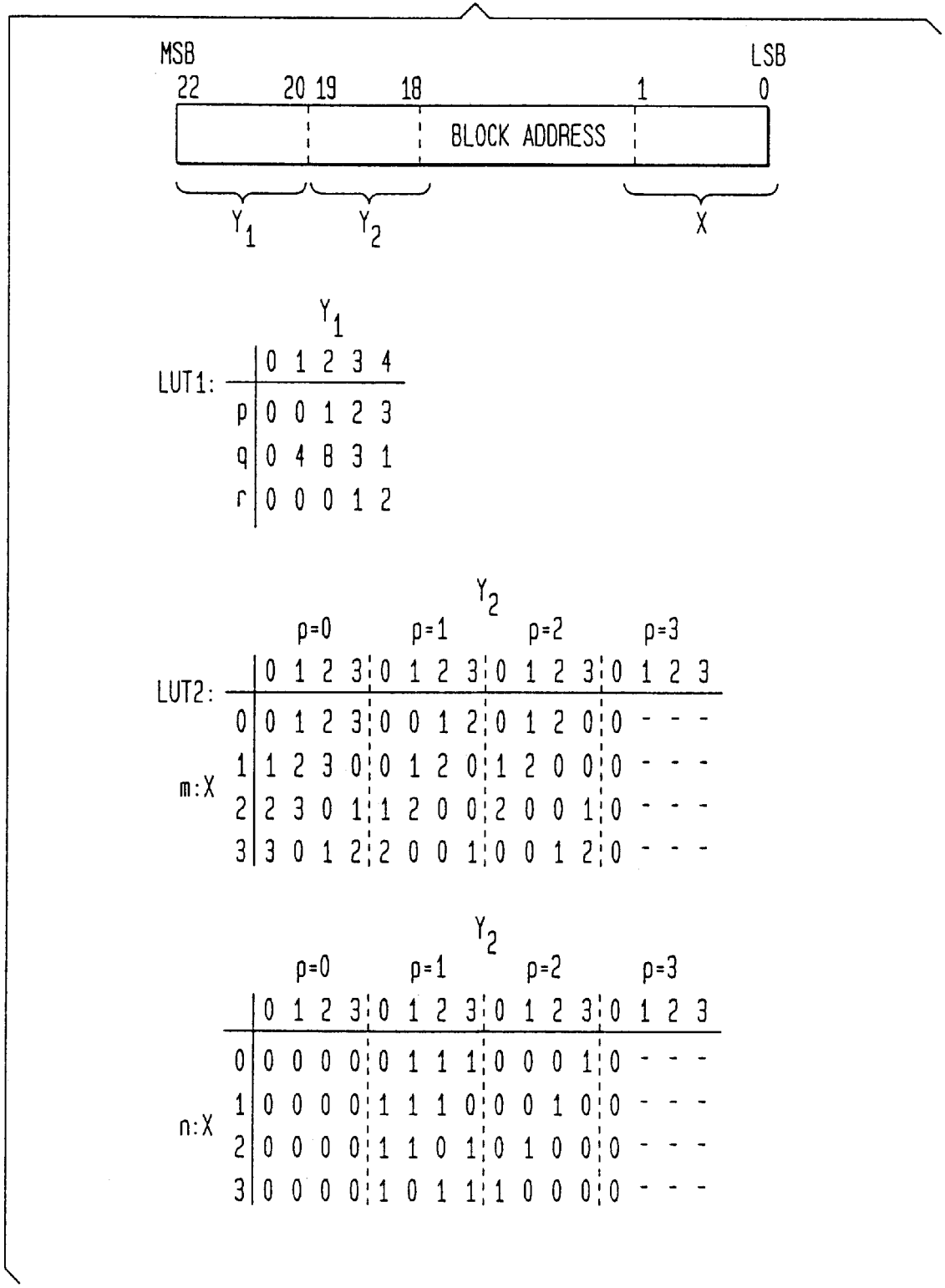
FIG. 10A and FIG. 10B show an example of memory mapping with the third embodiment of the invention, in a specific memory configuration.

FIG. 10A depicts the contents of the two lookup tables LUT1 and LUT2. In table LUT1, the five columns are addressed (selected) by the three-bit value of Y1, and a selected column then provides on three separate output lines the values p, q, and r which are stored in three positions of that column.

Table LUT2 has a more complicated structure because it is addressed by three variables and issues two independent values for each lookup operation. LUT2 consists of two sections each having four blocks. By each combination of a two-bit value Y2 and an auxiliary value p, one of the sixteen columns is selected in the upper and lower section. The two-bit value X selects one line in both sections, so that a single value for m (0, 1, 2 or 3) and single value for n (0 or 1) are issued simultaneously from the two table sections. The total required size TS for the two lookup tables in this implementation and example is ca. 32 bytes [(96+128+64):8].

Figure 10B:
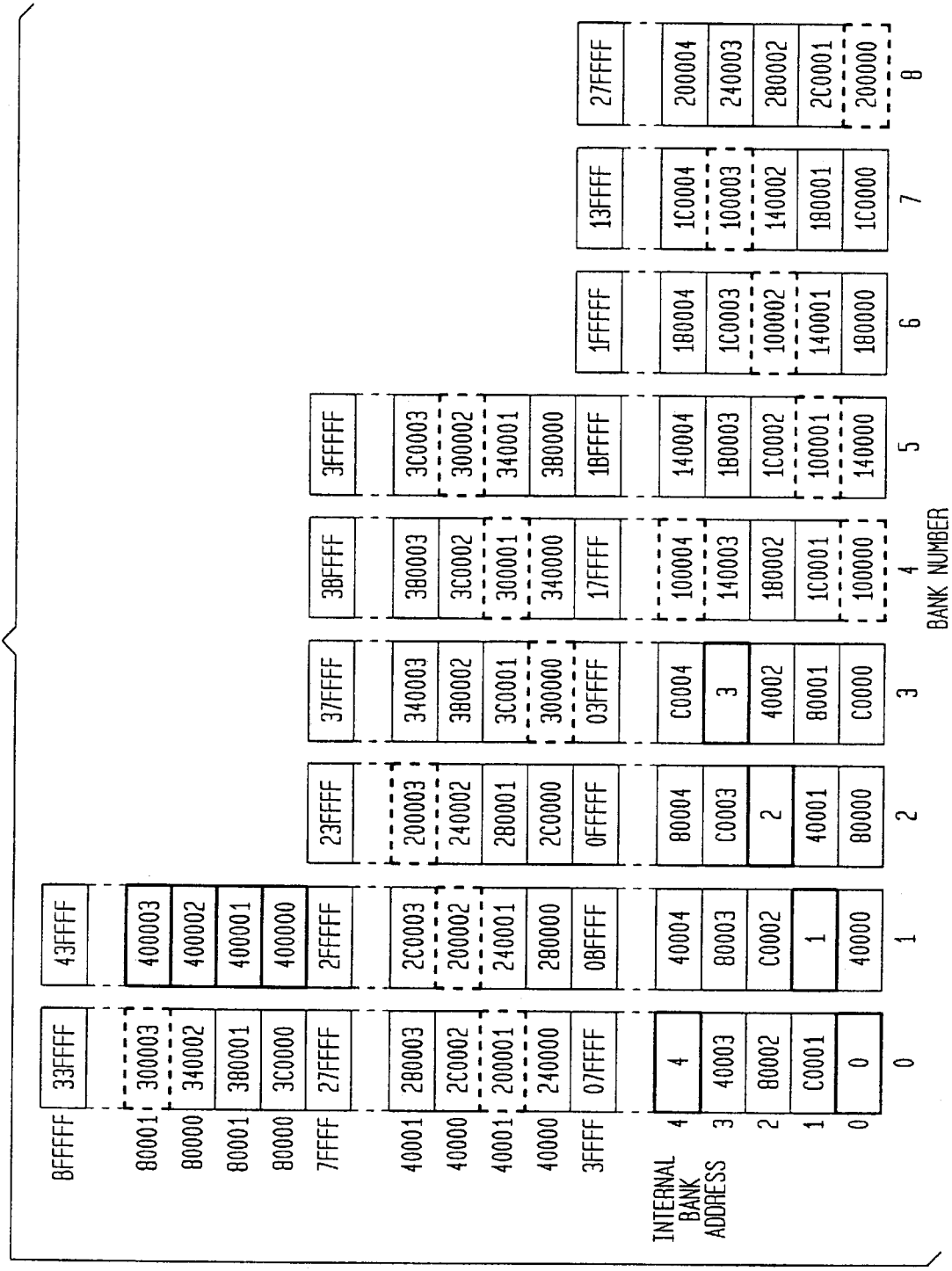

FIG. 10B shows the memory structure, the address mapping and the access distribution for this example. The memory consists of nine banks (non-power-of-2 number of memory banks) having three different sizes.

Stride 1 address sequences between 0 and 3FFFFFh are mapped with an interleave factor equal to 4 and stride 1 address sequences between 400000 and 43FFFFh are mapped with an interleave factor equal to 1.

In this example operation B is a combined multiplex and add operation:

if n=0 then Bank Number=m+q else Bank Number=m

Operation C is an add operation:

MSP of Internal Bank Address=n+r

In this example, a sequence of 2^20=100000h addresses that result in the same Y1 value, is mapped on a block of 100000h internal bank addresses that is distributed in four parts of 40000h internal bank addresses over 4 memory banks. The following sequences of 100000h addresses (except for the last sequence which is smaller) can be distinguished within this example:

| address sequence | Y1 value |
|---|---|
| 0 to 0FFFFFh | 0 |
| 100000h to 1FFFFFh | 1 |
| 200000h to 2FFFFFh | 2 |
| 300000h to 3FFFFFh | 3 |
| 400000h to 43FFFFh | 4 |

For each address sequence, the Y1 value is used to obtain three values p, q and r from LUT1. The value q equals the bank number of the first of the four memory banks on which the sequence is mapped. The internal address range within this first memory bank, that is used to map the given address sequence, equals (r*40000h) to (r*40000h+3FFFFh).

If the same internal bank address range is available within the next three succeeding memory banks, q+1, q+2 and q+3, then the address sequence is mapped on this internal bank address range within each of the memory banks q, q+1, q+2, q+3. This is the case with address sequence 0 to 0FFFFFFh is mapped on internal bank address range 0 3FFFFh within memory banks 0 to 3, and address sequence 100000h to 1FFFFFh which is mapped on internal bank address range 0 to 3FFFFh within memory banks 4 to 7. The first addresses of both address sequences are indicated in FIG. 10B.

If the same internal bank address range is not available within the next three succeeding memory banks, q+1, q+2 and q+3, then the following happens. If for example, only memory bank q contains the given internal bank address range, and memory bank numbers q+1, q+2, q+3 do not exist or, due a smaller bank size, do not contain the given internal bank address range, then instead of memory banks q+1, q+2 and q+3, the succeeding internal bank address range within memory banks 0, 1 and 2 is used. This is the case for address sequence 200000h to 2FFFFFh which is mapped on internal bank address range 0 to 3FFFFh within memory bank 8, and on internal bank address range 40000h to 7FFFFh within memory banks 0, 1 and 2. The first addresses of this address sequence are indicated in FIG. 10B.

For each address of a given address sequence, the value p and Y2 are used to obtain two values m and n from LUT2. The value p and n are used to distinguish between these situations mentioned above and are used in the example in the following way:

| p | n | internal bank address range | memory banks |
|---|---|---|---|
| 0 | 0 | r*40000h to r*40000h+3FFFFh | q, q+1, q+2, q+3 |
| 1 | 0 | r*40000h to r*40000h+3FFFFh | q, |
|   | 1 | (r+1+*40000h to (r+1) *40000 h+3FFFFh | 0, 1, 2 |
| 2 | 0 | r*40000h to r*40000h+3FFFFh | q, q+1, q+2 |
|   | 1 | (r+1)*40000h to (r+1)*40000h+3FFFFh | 0 |
| 3 | 0 | r*40000h to r*40000h+3FFFFh | q |

The actual mapping of successive addresses within an address sequence on the internal bank address ranges within the four banks is determined by the values m.

The value p=3 corresponds to the shorter address sequence 400000h to 43FFFFh which is mapped on within only one memory bank.

In this example, at most two different succeeding internal bank address ranges are used to map one address sequence corresponding to a given Y1 value. Depending on the memory bank configuration it is also possible that more than two succeeding internal bank address ranges are used, which results in n values larger than 1.

Handling of Address Sequences in Non-Contiguous Address Spaces

As was mentioned earlier, if the addresses to be mapped are from non-contiguous address spaces (i.e., if the total address space has "holes" in it), then the present invention can nevertheless be used. The solution is to assign a memory bank number for which no real memory exists, so that the hole in the address space and the non-existing, numbered memory bank correspond to each other.

Alternative Derivation of Internal Bank Address

In the above described embodiments and examples, the internal bank address was derived by obtaining the most significant part (MSP) in a table lookup operation, while the least significant part (LSP) was taken directly from the block address (given address). Another constitution of the internal bank address is of course possible with the invention. E.g., a middle part of the internal bank address may be obtained by table lookup, and the leading (most significant) and the trailing (least significant) part will be directly derived from selected, predetermined portions of the block address (given address).

Rules for Selection X and Y

Any bits can be selected from the given block address for constituting (forming) the first selected portion X and the second selected portion Y. That is, bits $p_0 \ldots p_{x-1}$ of the first portion X, and bits $q_0 \ldots q_{y-1}$ of the second portion Y can be arbitrarily selected from the given block address. Of course, no overlap must occur (i.e., none of the block address bits must be used more than once).

It should be noted that the bits selected from the given block address for constituting X or Y, need not be taken from continuous positions but can be bits or bit groups from non-contiguous positions of the given block address.

Implementation of the Lookup Table

Each lookup table used for address mapping can be provided as a separately addressable circuitry, either read-only or loadable with the respective conversion table, in the memory controller of the system. It can, however, also be provided in the processor hardware (interface).

If different pairs of lookup tables (LUT1, LUT2) are to be used for different applications, such pairs of tables can either be provided as a plurality of read-only tables (selected according to the active application), or they can be loaded as required into a single table memory circuit at the start of the respective application.

While the invention has been particularly shown and described with respect to preferred embodiments thereof, it will be understood by those skilled in the art that the foregoing and other changes in form and details may be made therein without departing from the spirit and scope of the invention.

Having thus described my invention, what I claim as new, and desire to secure by Letters Patent is:

1. A method for mapping a given address into a memory bank identification and an internal memory bank address, for memory access in a system where data are stored in a plurality of memory banks in an interleaved fashion, the method comprising the steps of:

deriving said memory bank identification by a lookup operation in a first lookup table, using as input two separate selected portions of said given address;

deriving a most significant part of the internal memory bank address within said identified memory bank by a lookup operation in a second table using as input at least one of said two separate selected portions of said given address; and extracting a least significant part of the internal memory bank address within said identified memory bank from said given address.

2. The method according to claim 1, wherein a single lookup table is used for simultaneously deriving said memory bank identification and said least significant part of the internal memory bank address, said single lookup table being addressed by said two separate selected portions of said given address.

3. The method according to claim 2, wherein said single lookup table comprises at least two sections for respectively storing memory bank identifications and least significant parts of internal memory bank addresses, and said at least two table sections are addressed simultaneously.

4. The method according to claim 1, wherein two separate lookup tables are used for deriving said memory bank identification, using as input for each of them at least one, or a partial section of one, of said two selected portions of said given address and said most significant part of the inter memory bank address is also derived from an output of at least one of said two separate lookup tables.

5. The method according to claim 4, wherein a first one of said lookup tables is addressed by a first partial section of one of said two selected portions of the given address and a second one of said lookup tables is addressed by another one of said two selected portions and a second partial section of the one of said two selected portions of the given address.

6. The method according to claim 4, wherein output values of both lookup tables are combined in a predetermined operation for deriving said memory bank identification.

7. The method according to claim 5, wherein an output of said first one of said lookup tables is used in addition to selected portions from said given address for addressing the second one of said lookup tables.

8. The method according to claim 4, wherein said most significant part of the internal memory bank address is derived by combining an output of the lookup operation in one of said lookup tables with an output of the lookup operation in the other one of said lookup tables.

9. The method according to claim 1, wherein after canceling one of said two separate selected portions a remainder of said given address is taken as the least significant part of the internal memory bank address.

10. A mapping means for mapping a given address into a memory bank identification and an internal memory bank address, for memory access in a system where data are stored in a plurality of memory banks in an interleaved fashion, the mapping means comparing:

means for deriving said memory bank identification by a lookup operation in a first lookup table using as input two separate selected portions of said given address;

means for deriving a most significant part of the internal memory bank address within said identified memory bank by a lookup operation in a second table using as input at least one of said two separate selected portions of said given address; and means for extracting a least significant part of the internal memory bank address within said identified memory bank from said given address.

11. The mapping means according to claim 10, wherein a single lookup table is provided for simultaneously deriving said memory bank identification and said least significant part of the internal memory bank address, said single lookup table being addressed by said two separate selected portions of said given address.

12. The mapping means according to claim 11, wherein said single lookup table comprises at least two sections for respectively storing memory bank identifications and least significant parts of internal memory bank addresses and said at least two table sections are addressed simultaneously.

13. The mapping means according to claim 10, wherein two separate lookup tables are used for deriving said memory bank identification, each of them having an input for at least one, or a partial section of one, of said two selected portions of said given address; and the mapping means further comprises means for deriving said most significant part of the internal memory bank address from an output of at least one of said two separate lookup tables.

14. The mapping means according to claim 13, wherein a first one of said lookup tables is addressed by a first partial section of one of said two selected portions of the given address and a second one of said lookup tables is addressed by another one of said two selected portions and a second partial section of the one of said two selected portions of the given address.

15. The mapping means according to claim 13, wherein mapping means further comprises means for combining values from outputs of both lookup tables in a predetermined operation for generating said memory bank identification.

16. The mapping means according to claim 14, wherein the second of said lookup tables has an additional address input connected to an output of said first one of said lookup tables in addition to address inputs for selected portions from said given address.

17. The mapping means according to claim 13, wherein the mapping means further comprises means for deriving sad most significant part of the internal memory bank address by combining an output of one of said lookup tables with an output of the other one of said lookup tables.

18. The mapping means according to claim 10, wherein the mapping means further comprises means for furnishing the least significant part of the internal memory bank address by canceling one of said selected portions and taking a remainder of said given address as the least significant part of the internal memory bank address.

* * * * *

UNITED STATES PATENT AND TRADEMARK OFFICE
CERTIFICATE OF CORRECTION

PATENT NO.     : 6,453,380 B1  
DATED          : September 17, 2002  
INVENTOR(S)    : Jan Van Lunteren Page 1 of 1

It is certified that error appears in the above-identified patent and that said Letters Patent is hereby corrected as shown below:

Column 2,
Line 35, "advantage s" should read -- advantages --

Column 3,
Line 19, "Physical address..." should begin a new paragraph.
Line 34, "Interleave..." should begin a new paragraph.

Column 10,
Line 61, "inter" should read -- internal --

Column 11,
Line 24, "comparing" should read -- comprising --

Column 12,
Line 32, "sad" should read -- said --

Signed and Sealed this

Twenty-second Day of April, 2003

JAMES E. ROGAN
*Director of the United States Patent and Trademark Office*